(12) United States Patent
Katsuyama et al.

(10) Patent No.: US 10,460,703 B2
(45) Date of Patent: Oct. 29, 2019

(54) DISPLAY CONTROL APPARATUS, DISPLAY CONTROL METHOD, AND CAMERA MONITORING SYSTEM

(71) Applicant: ALPINE ELECTRONICS, INC., Tokyo (JP)

(72) Inventors: Yoshihiro Katsuyama, Fukushima (JP); Ryosuke Tatsumi, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/878,722

(22) Filed: Jan. 24, 2018

(65) Prior Publication Data

US 2018/0301122 A1    Oct. 18, 2018

(30) Foreign Application Priority Data

Apr. 13, 2017 (JP) ................. 2017-079772

(51) Int. Cl.
*G09G 5/377* (2006.01)
*B60R 1/04* (2006.01)
(Continued)

(52) U.S. Cl.
CPC .............. *G09G 5/377* (2013.01); *B60R 1/00* (2013.01); *B60R 1/04* (2013.01); *B60R 1/12* (2013.01); *G06F 3/147* (2013.01); *G06K 9/4609* (2013.01); *H04N 7/183* (2013.01); *B60R 2001/1253* (2013.01); *B60R 2300/304* (2013.01); *B60R 2300/306* (2013.01); *B60R 2300/408* (2013.01); *B60R 2300/8046* (2013.01);
(Continued)

(58) Field of Classification Search
CPC ............ G09G 5/377; B60R 2001/1215; B60R 2001/1253; B60R 2300/304; B60R 2300/8046; B60R 2300/8066; B60R 2300/8093; G06K 9/00805; H04N 7/183
See application file for complete search history.

(56) References Cited

U.S. PATENT DOCUMENTS

2012/0062743 A1 * 3/2012 Lynam ................... B60Q 9/005
                                                    348/148
2012/0320207 A1 * 12/2012 Toyofuku ................. B60R 1/00
                                                    348/148
(Continued)

FOREIGN PATENT DOCUMENTS

JP    2013-003641        1/2013
JP    2013003641    *   1/2013    ............... G08G 1/16

*Primary Examiner* — Grace Q Li
(74) *Attorney, Agent, or Firm* — IPUSA, PLLC (57) ABSTRACT

A display control apparatus configured to be connected to an imaging apparatus is provided. The display control apparatus includes an obtaining unit configured to obtain image data captured by the imaging apparatus by capturing an image behind a vehicle; an edge image generation unit configured to generate edge image data that clearly indicates a peripheral portion of the image data to be viewed via an electric mirror that is placed at a rear-view mirror position inside the vehicle; a display image generation unit configured to generate display image data by superimposing the generated edge image data onto the obtained image data; and a control unit configured to control the generated display image data to be viewed via the electric mirror.

6 Claims, 9 Drawing Sheets

(51) Int. Cl.
*B60R 1/12* (2006.01)
*G06K 9/46* (2006.01)
*G06K 9/00* (2006.01)
*H04N 7/18* (2006.01)
*B60R 1/00* (2006.01)
*G06F 3/147* (2006.01)

(52) U.S. Cl.
CPC ............... *B60R 2300/8066* (2013.01); *B60R 2300/8093* (2013.01); *G06K 9/00805* (2013.01); *G09G 2340/125* (2013.01); *G09G 2380/10* (2013.01)

(56) References Cited

U.S. PATENT DOCUMENTS

2014/0111637 A1* 4/2014 Zhang ..................... B60R 1/088
  348/118
2016/0297363 A1* 10/2016 Ishizuka .................. B60R 1/00

* cited by examiner

DISPLAY CONTROL APPARATUS, DISPLAY CONTROL METHOD, AND CAMERA MONITORING SYSTEM

BACKGROUND OF THE INVENTION

1. Field of the Invention

The present invention relates to a display control apparatus, a display control method, and a camera monitoring system.

2. Description of the Related Art

Conventionally, a display control technique is known in which a camera monitoring system is installed in a vehicle, a captured image behind the vehicle is displayed by a display apparatus, or the like, and thus, the display apparatus, or the like, functions as an electric mirror. In the case where an electric mirror is compared with conventional mirrors used for viewing behind the vehicle (side mirror, rear-view mirror), the electric mirror has an advantage in that, for example, a distant object can be viewed clearly.

CITATION LIST

Patent Document

[Patent Document 1] Japanese Unexamined Patent Application Publication No. 2013-003641

SUMMARY OF THE INVENTION

Technical Problem

With respect to the above, in the case where an electric mirror is used in place of the rear-view mirror as described above, there is a problem as follows. In general, different from the rear-view mirror, an electric mirror does not provide a view inside the vehicle. Therefore, for a driver, it is difficult to clearly recognize a boundary between a captured image behind the vehicle that is viewed via the electric mirror and the surroundings of the captured image (e.g., a front view that is viewed through a windshield). As a result, there is a possibility that the driver mistakenly perceives the captured image behind the vehicle that is viewed via the electric mirror as a front view.

In view of the above problem, it is an object of the present invention to make it easy to recognize a boundary between the image that is viewed via the electric mirror and the surroundings of the image.

Solution to Problem

According to an aspect of one or more embodiments, a display control apparatus that is connected to an imaging apparatus is provided. The display control apparatus includes: an obtaining unit configured to obtain image data captured by the imaging apparatus by capturing an image behind a vehicle; an edge image generation unit configured to generate edge image data that clearly indicates a peripheral portion of the image data viewed via an electric mirror that is placed at a rear-view mirror position inside the vehicle; a display image generation unit configured to generate display image data by superimposing the generated edge image data onto the obtained image data; and a control unit configured to control the generated display image data to be viewed via the electric mirror.

Advantageous Effects of Invention

It becomes easier to recognize a boundary between an image viewed via an electric mirror and the surroundings of the image.

DETAILED DESCRIPTION OF THE PREFERRED EMBODIMENTS

In the following, one or more embodiments of the present invention will be described while making reference to the drawings. It should be noted that, in the present specification and the drawings, the same reference numeral is given to an element that has substantially the same functional structure, and duplicated descriptions will be omitted.

First Embodiment

<System Structure of Camera Monitoring System>

Figure 1:
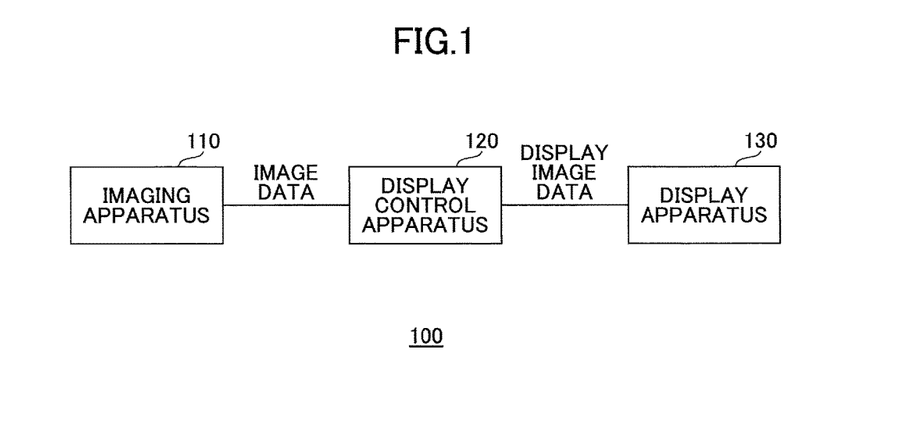
FIG. 1 is a drawing illustrating an example of a system structure of a camera monitoring system according to a first embodiment.

First, a system structure of a camera monitoring system that is installed in a vehicle will be described. FIG. 1 is a drawing illustrating an example of a system structure of a camera monitoring system 100 according to a first embodiment. As illustrated in FIG. 1, the camera monitoring system 100 includes an imaging apparatus 110, a display control apparatus 120, and a display apparatus 130. It should be noted that, in one or more embodiments, it is assumed that the camera monitoring system 100 is started when an ignition switch of the vehicle is turned ON, and is stopped when the ignition switch is turned OFF. However, the camera monitoring system 100 may be started and stopped based on instructions of a driver of the vehicle.

The imaging apparatus 110 captures an image of a view behind the vehicle, and transmits image data that is obtained by horizontally flipping the captured image to the display control apparatus 120. The display control apparatus 120 superimposes data with a predetermined color onto a peripheral portion of the image data transmitted from the imaging apparatus 110 by processing the image data, and transmits, as display image data, the superimposed result to the display apparatus 130. The display apparatus 130, an example of an output apparatus, is a liquid crystal display apparatus in one or more embodiments, and displays the display image data transmitted from the display control apparatus 120.

<Placement Example of Display Apparatus>

Figure 2:
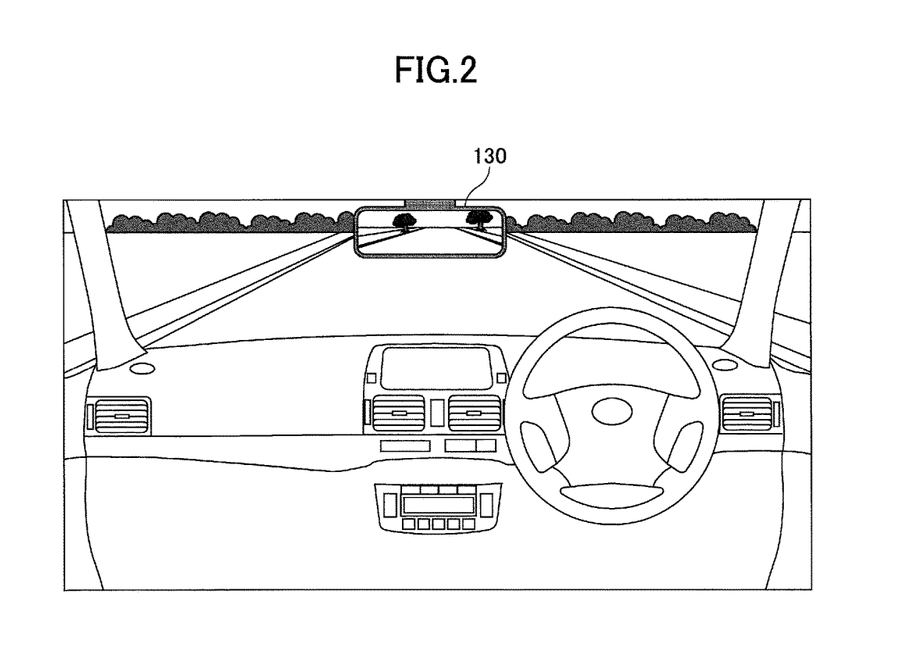
FIG. 2 is a drawing illustrating a placement example of a display apparatus.

Next, a placement example of the display apparatus 130 will be described. FIG. 2 is a drawing illustrating the placement example of the display apparatus 130. As illustrated in FIG. 2, the display apparatus 130 is placed at a rear-view mirror position inside a vehicle (a central position on the near side of the windshield), and functions as an electric mirror in place of the rear-view mirror.

<Hardware Structure of Display Control Apparatus>

Figure 3:
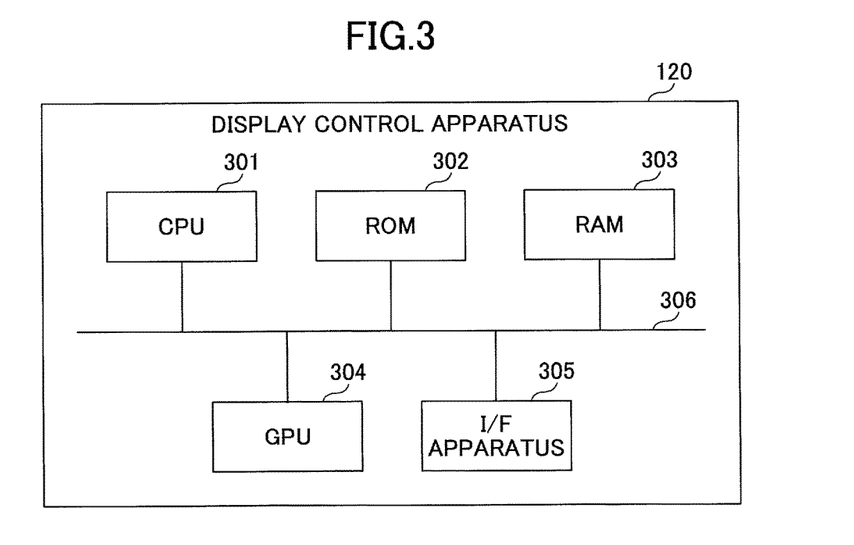
FIG. 3 is a drawing illustrating an example of a hardware structure of a display control apparatus.

Next, a hardware structure of the display apparatus 120 will be described. FIG. 3 is a drawing illustrating an example of a hardware structure of the display control apparatus 120. As illustrated in FIG. 3, the display control apparatus 120 includes a CPU (Central Processing Unit) 301, a ROM (Read Only Memory) 302, and a RAM (Random Access Memory) 303. Further, the display control apparatus 120 includes a GPU (Graphic Processing Unit) 304 and an I/F (Interface) apparatus 305. It should be noted that the units of the display control apparatus 120 are connected to each other via a bus 306.

The CPU 301 is a device for executing various programs (e.g., a display control program, etc.,) installed in the ROM 302. The ROM is a nonvolatile memory and functions as a main memory device for storing the various programs executed by the CPU 301. The RAM 303 is a volatile memory such as a DRM (Dynamic Random Access Memory), an SRM (Static Random Access Memory), etc. The RAM 303 functions as a main memory device for providing a work area that is generated when the various programs installed in the ROM 302 are executed by the CPU 301.

The GPU 304 is an integrated circuit dedicated for executing image processing, and, in one or more embodiments of the present invention, generates display image data to be displayed by the display apparatus 130 based on an instruction from the CPU 301 executing the display control program. The I/F apparatus 305 is a connection device for connecting the imaging apparatus 110 and the display apparatus 130 to the display control apparatus 120.

<Functional Structure of Display Control Apparatus>

Figure 4:
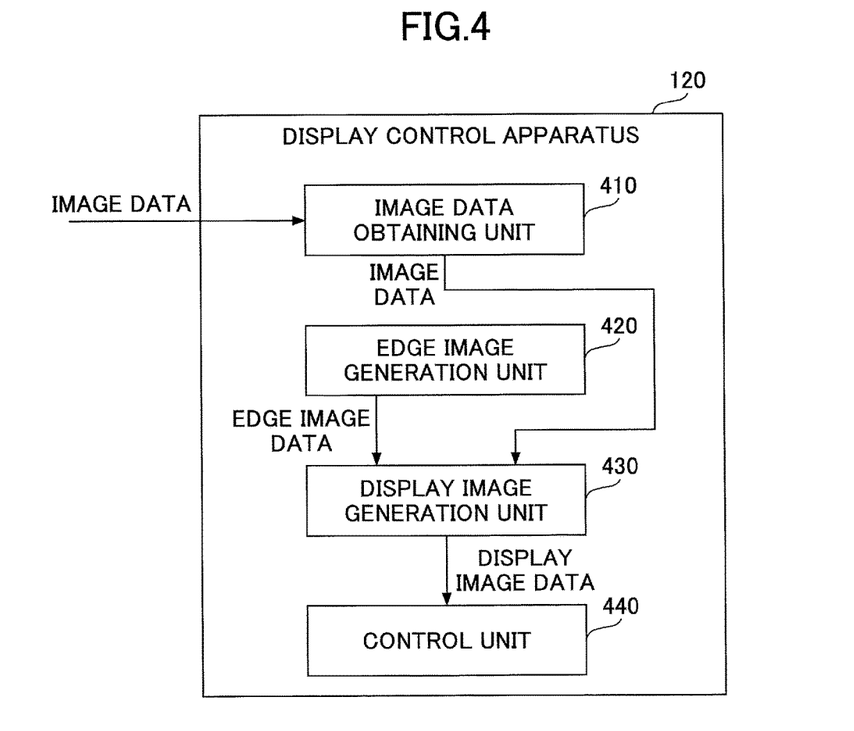
FIG. 4 is drawing illustrating an example of a functional structure of a display control apparatus according to the first embodiment.

Next, a functional structure of the display control apparatus 120 will be described. FIG. 4 is drawing illustrating an example of a functional structure of the display control apparatus 120 according to the first embodiment. As described above, the display control program is installed in the display control apparatus 120. When the camera monitoring system 100 is started, the display control apparatus 120 executes the display control program. According to the above operations, the display control apparatus 120 functions as an image data obtaining unit 410, an edge image generation unit 420, a display image generation unit 430, and a control unit 440.

The image data obtaining unit 410 obtains image data transmitted from the imaging apparatus 110. The image data obtaining unit 410 transmits the obtained image data to the display image generation unit 430 frame by frame.

The edge image generation unit 420 generates data with predetermined color that clearly indicates a peripheral portion of the image data to be displayed by the display apparatus 130 (referred to as "edge image data"), and transmits the generated data to the display image generation unit 430. The edge image data, generated by the edge image generation unit 420, is, for example, data that is used for causing the entire peripheral portion of the image data to be white. However, the edge image data generated by the edge image generation unit 420 is not limited to the above. For example, the position at which the data with the predetermined color is placed is not limited the entire peripheral portion of the image data, and may be only corner portions of the peripheral portion. Alternatively, the position may be three sides (or, one side, two sides) of the four sides of the peripheral portion. Further, it is not necessary for the data with the predetermined color to be placed in a solid strip shape. The data with the predetermined color may be placed in a dotted strip shape.

Further, the predetermined color to be placed is not limited to white, but may be a different predetermined color, or may be selected from a plurality of colors. In this case, the selection of colors to be placed may be performed automatically, or may be performed based on an instruction of a driver. In any case, it is assumed that the edge image data should be generated in a display format (or, display manner, display style) that causes, when the display image data is displayed by the display apparatus 130, the boundary between the display image data and a front view to be clearly recognized.

The display image generation unit 430 generates display image data by superimposing the edge image data generated by the edge image generation unit 420 onto each frame of the image data transmitted from the image data obtaining unit 410, and transmits the generated display image data to the control unit 440. The control unit 440 controls the display image data transmitted from the display image generation unit 430 to be displayed by the display apparatus 130. With the above operations, it is possible for the driver of the vehicle to recognize the display image data via the display apparatus 130.

<Display Example of Display Apparatus>

Next, a display example of the display apparatus 130 will be described. FIGS. 5A-5D are drawings illustrating display examples of the display apparatus 130. It should be noted that, in each example in FIGS. 5A-5D, both the display image data recognized by the driver of the vehicle via the display apparatus 130 and a front view recognized by the driver through the windshield that is behind the display apparatus 130.

Figures 5A, 5B:
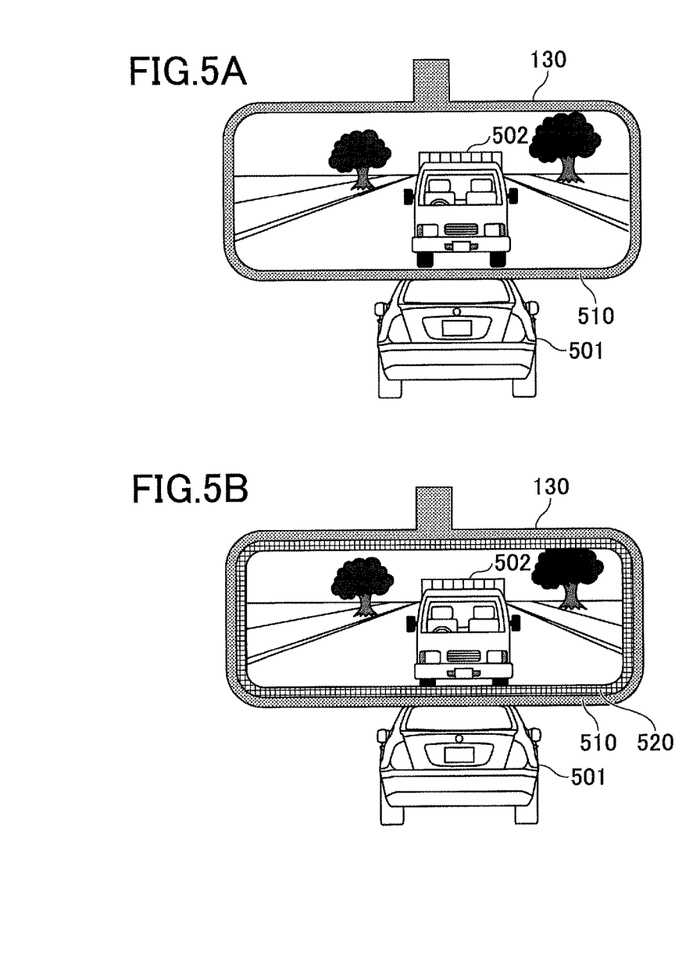
FIGS. 5A-5D are drawings illustrating display examples of the display apparatus.
Figure 5C:
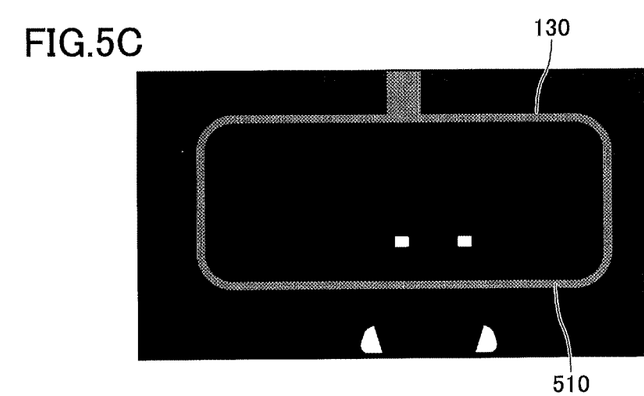
Figure 5D:
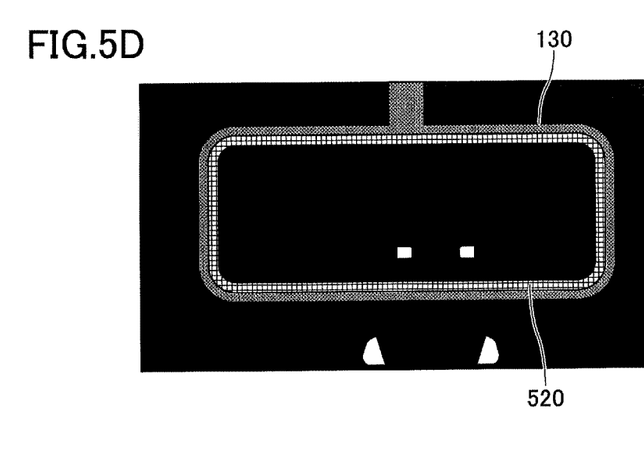

Of all examples in FIGS. 5A-5D, FIGS. 5A and 5C are provided for comparison and illustrate display examples of a case in which the display image data, onto which the edge image data is not superimposed, is displayed by the display apparatus 130. On the other hand, FIGS. 5B and 5D illustrate display examples of a case in which the display image data, onto which the edge image data is superimposed, is displayed by the display apparatus 130.

As illustrated in FIG. 5A, it is assumed that a rear surface of an ahead vehicle (a vehicle traveling ahead) 501, viewed through the windshield, is located adjacent to a front surface of a behind vehicle (a vehicle traveling behind) 502, viewed via the display apparatus 130. As described above, a view inside the vehicle is not provided by the display apparatus 130, and thus, the boundary between the rear surface of the ahead vehicle 501 and the front surface of the behind vehicle 502 is only an outer frame 510 of the display apparatus 130. Therefore, in the case of the display image data onto which no edge image data has been superimposed, it is difficult for a driver of the vehicle to recognize the boundary between the front view viewed through the windshield and the display image data viewed via the display apparatus 130. As a result, there is a possibility that the driver mistakenly perceives the display image data viewed via the display apparatus 130 as a front view.

On the other hand, FIG. 5B illustrates an example in which the display image data, onto which the edge image data 520 has been superimposed, is displayed by the display apparatus 130. As illustrated in FIG. 5B, because the edge image data 520 has been superimposed, the boundary between the rear surface of the ahead vehicle 501 and the front surface of the behind vehicle 502 includes the outer frame 510 of the display apparatus 130 and the edge image data 520. In other words, by superimposing the edge image data, it becomes easier for a driver of the vehicle to recognize the boundary between the front view viewed through the windshield and the display image data displayed by the display apparatus 130. As a result, it is possible to reduce the possibility of the driver mistakenly perceiving the display image data viewed via the display apparatus 130 as a front view.

FIG. 5C illustrates a similar situation as FIG. 5A reproduced for the night time. In case of the night time, when compared with a case of the day time (a case of FIG. 5A), it becomes difficult to recognize the outer frame 510 of the display apparatus 130, and thus, the possibility of the driver mistakenly perceiving display image data viewed via the display apparatus 130 as a front view increases.

With respect to the above, as illustrated in FIG. 5D, by superimposing the edge image data, the boundary between taillights of the ahead vehicle 501 and headlights of the behind vehicle 502 includes the edge image data 520. In other words, by superimposing the edge image data, in the case of night time, it becomes easier for a driver of the vehicle to recognize the boundary between the front view viewed through the windshield and the display image data displayed by the display apparatus 130. As a result, it is possible to reduce the possibility of the driver mistakenly perceiving the display image data viewed via the display apparatus 130 as a front view.

It should be noted that, compared with a case of causing the outer frame 510 of the display apparatus 130 itself to be easier to be recognized (e.g., embedding an LED, or the like, into the outer frame 510, and turning ON the embedded LED), a camera monitoring system 100 according to an embodiment of the present invention has an advantage in that the similar effects can be realized with lower cost.

<Flow of Display Control Process>

Figure 6:
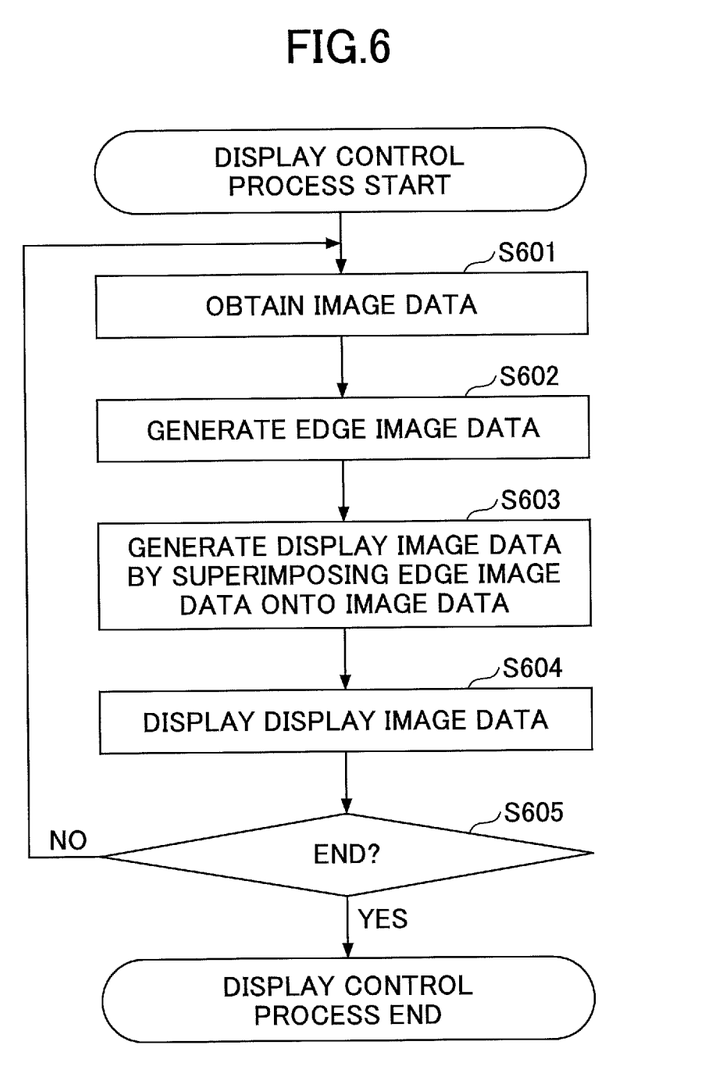
FIG. 6 is a flowchart illustrating a display control process flow of the display control apparatus according to the first embodiment.

Next, a process flow of a display control performed by the display control apparatus 120 will be described. FIG. 6 is a flowchart illustrating a display control process flow of the display control apparatus 120 according to the first embodiment. When the camera monitoring system 100 is started, the display control apparatus 120 performs a display control process illustrated in FIG. 6.

In step S601, the image data obtaining unit 410 obtains image data from the imaging apparatus 110, and transmits the image data to the display image generation unit 430 frame by frame. In step S602, the edge image generation unit 420 generates edge image data and transmits the generated edge image data to the display image generation unit 430.

In step S603, the display image generation unit 430 generates display image data by superimposing the edge image data transmitted from the edge image generation unit 420 onto the image data transmitted from the image data obtaining unit 410, and transmits the generated display image data to the control unit 440. In step S604, the control unit 440 controls the display image data to be displayed by the display apparatus 130 frame by frame.

In step S605, the image data obtaining unit 410 determines whether the display control process should be finished. In the case where the operation of the camera monitoring system 100 should be continued, it is determined that the display control process should not be finished in step S605 (in case of "No" in step S605), and the flow returns to step S601. On the other hand, in the case where the operation of the camera monitoring system 100 should be stopped (in case of "Yes" in step S605), the display control process is ended.

SUMMARY

As clearly described in the above, a display control apparatus 120 according to an embodiment of the present invention:

generates display image data by superimposing the edge image data onto image data obtained by horizontally flipping an image captured by the imaging apparatus 110 used for capturing an image of a view behind the vehicle, and displays the generated display image data on the display apparatus 130 that is placed at a rear-view mirror position inside the vehicle, and that functions as an electric mirror.

With the above operations, the display apparatus 130 displays an image in which the peripheral portion has been clearly indicated, and thus, it becomes easier to recognize the boundary between the image viewed via the display apparatus 130 and the front view viewed through the windshield (that is, the boundary between the image and the surroundings of the image).

Second Embodiment

In the first embodiment, it is described that the edge image data is generated for making it easier to recognize the boundary between the image viewed via the display apparatus 130 and the front view viewed through the windshield. With respect to the above, in a second embodiment, a portion of the edge image data generated for making it easier to recognize the boundary is used for reporting, to the driver of vehicle, information received from an in-vehicle network. In the following, the second embodiment will be described by mainly describing a difference from the first embodiment.

<System Structure of Camera Monitoring System>

Figure 7:
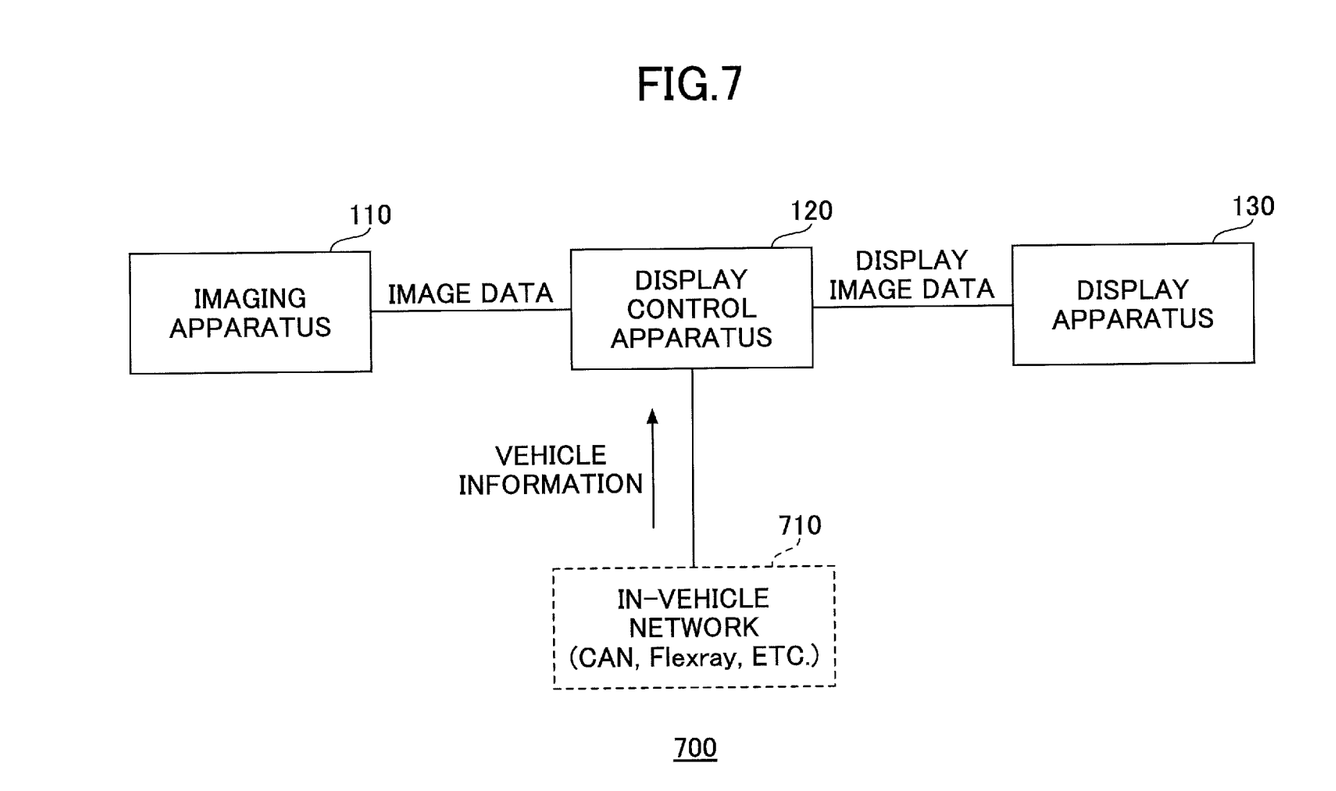
FIG. 7 is a drawing illustrating an example of a system structure of a camera monitoring system according to a second embodiment.

FIG. 7 is a drawing illustrating an example of a system structure of a camera monitoring system 700 according to a second embodiment. The camera monitoring system 700 illustrated in FIG. 7 differs from the camera monitoring system 100 in FIG. 1 in that the display control apparatus 120 is connected to an in-vehicle network 710, and that vehicle information is received from the in-vehicle network 710.

The in-vehicle network 710 is a network mounted on the vehicle, and communications are performed based on standards such as CAN (Controller Area Network), Flexray, etc. In the present embodiment, the display control apparatus 120 is connected to the in-vehicle network 710, and thus, the display control apparatus 120 receives, as the vehicle information, data indicating a distance to an obstacle behind the vehicle and a direction of the obstacle. It should be noted that it is assumed that the data, indicating a distance to an obstacle behind the vehicle and a direction of the obstacle, is generated based on, for example, a received signal from a radar sensor, a sonar sensor, or the like, installed in the rear of the vehicle, and the data can be received via the in-vehicle network 710.

<Functional Structure of Display Control Apparatus>

Figure 8:
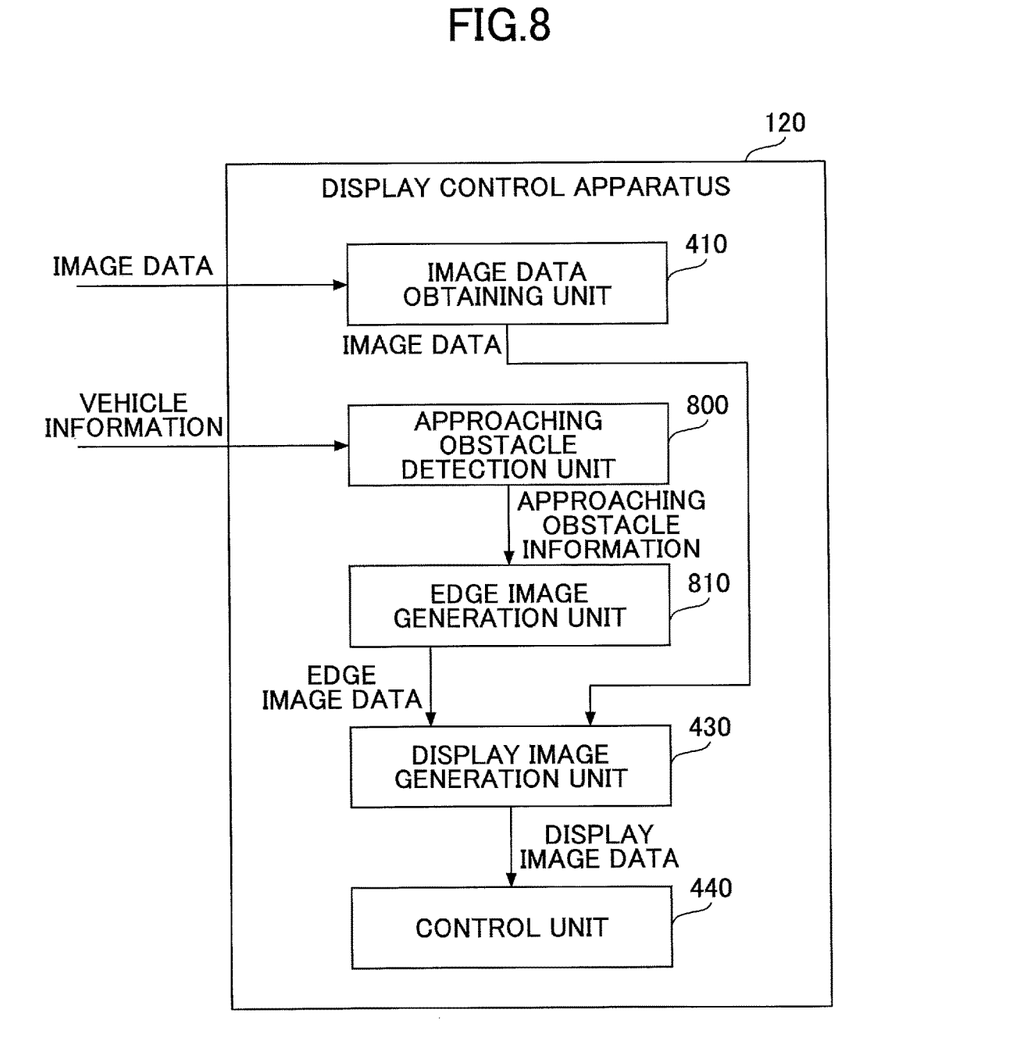
FIG. 8 is drawing illustrating an example of a functional structure of a display control apparatus according to the second embodiment.

Next, a functional structure of a display control apparatus 120 according to the second embodiment will be described. FIG. 8 is drawing illustrating an example of a functional structure of the display control apparatus 120 according to the second embodiment. Differences between the functional structures in FIG. 8 and FIG. 4 include an approaching obstacle detection unit 800 and an edge image generation unit 810.

The approaching obstacle detection unit 800 detects an obstacle approaching with a speed equal to or greater than a predetermined speed by receiving vehicle information from the in-vehicle network 710 and by monitoring a distance to the obstacle behind the vehicle. Further, in the case where an object, approaching with a speed equal to or greater than the predetermined speed, is detected, the approaching obstacle detection unit 800 transmits, as approaching obstacle information, the distance to the obstacle and the direction of the obstacle to the edge image generation unit 810.

Upon receiving the approaching obstacle information from the approaching obstacle detection unit 800, the edge image generation unit 810 identifies a position of the obstacle on the image data based on the direction and the distance of the approaching obstacle. Further, when generating the edge image data, the edge image generation unit 810 causes the color of a portion corresponding to the identified position to be different (e.g., red) from the color of other portions, and transmits the edge image data to the display image generation unit 430.

<Display Example of Display Apparatus>

Figure 9A:
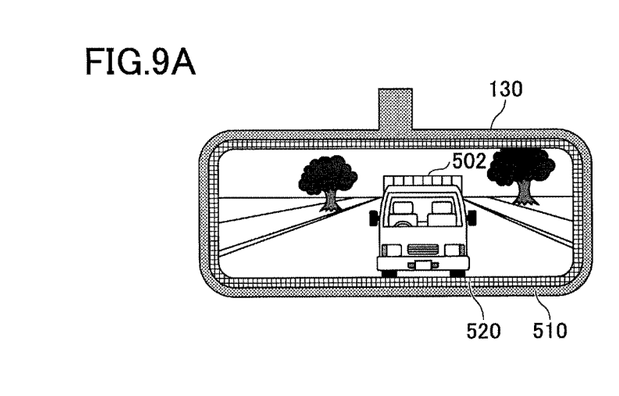
FIGS. 9A-9D are drawings illustrating display example of the display apparatus.
Figure 9B:
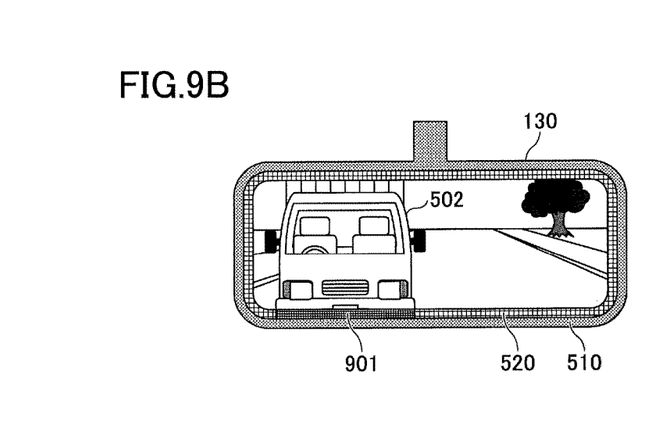
Figure 9C:
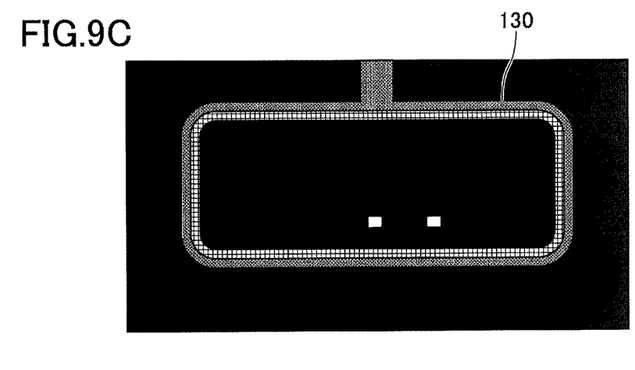
Figure 9D:
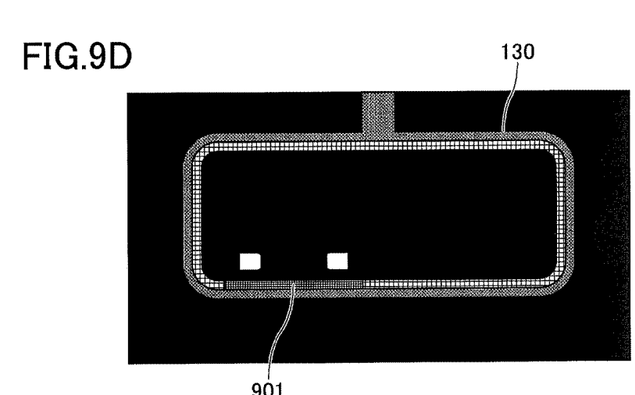

Next, a display example of the display apparatus 130 will be described. FIGS. 9A-9D are drawings illustrating display examples of the display apparatus 130. Of the display examples, examples in FIGS. 9A and 9C illustrate a state prior to a state in which an obstacle (a behind vehicle 502) approaches with a speed equal to or greater than a predetermined speed, and examples in FIGS. 9B and 9D illustrate a state in which the obstacle (the behind vehicle 502) has approached with a speed equal to or greater than the predetermined speed.

As illustrated in FIGS. 9A and 9C, the edge image data 520 has a uniform color in a state in which the behind vehicle 502 has not yet approached with a speed equal to or greater than the predetermined speed. On the other hand, as illustrated in FIGS. 9B and 9D, in a state in which the behind vehicle 502 has approached with a speed equal to or greater than the predetermined speed, the color of a portion 901 corresponding to a position, of the behind vehicle 502 on the image data, identified based on the direction and the distance of the behind vehicle 502, is changed to a color different from the color of the other portions. With the above operations, it is possible for the driver to recognize that the behind vehicle 502 is approaching with a speed equal to or greater than the predetermined speed via the display apparatus 130.

<Flow of Display Control Process>

Figure 10:
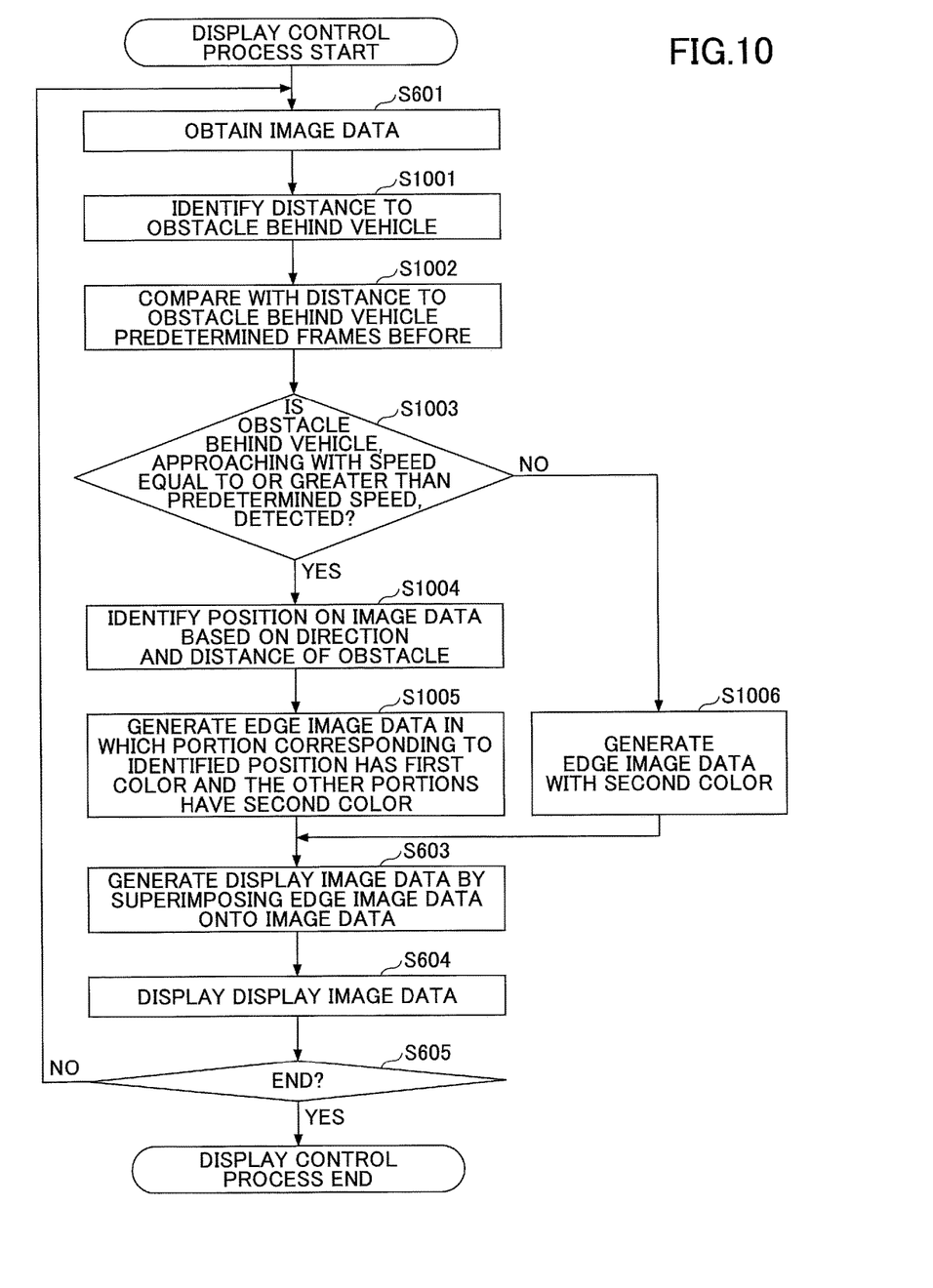
FIG. 10 is a flowchart illustrating a display control process flow of the display control apparatus according to the second embodiment.

Next, a process flow of display control performed by the display control apparatus 120 will be described. FIG. 10 is a flowchart illustrating a display control process flow of the display control apparatus 120 according to the second embodiment. Differences between the flowcharts in FIG. 10 and FIG. 6 include steps S1001 to S1006.

In step S1001, the approaching obstacle detection unit 800 receives vehicle information from the in-vehicle network 710 and identifies a distance to an obstacle behind the vehicle. In step S1002, the approaching obstacle detection unit 800 compares a distance to the obstacle behind the vehicle identified at the timing of obtaining the image data with respect to a predetermined previous number of frames, with a distance to the obstacle behind the vehicle identified in step S1001.

In step S1003, the approaching obstacle detection unit 800 detects an obstacle behind the vehicle approaching with a speed equal to or greater than a predetermined speed by monitoring a change, per unit time, of the distance to the obstacle behind the vehicle. In step S1003, in the case where an obstacle behind the vehicle approaching with a speed equal to or greater than the predetermined speed is detected (in case of "Yes" in step S1003), the flow moves to step S1004.

In step S1004, the approaching obstacle detection unit 800 transmits, as approaching obstacle information, the distance to the obstacle and the direction of the obstacle to the edge image generation unit 810. The edge image generation unit 810 identifies a position of the obstacle on the image data based on the transmitted approaching obstacle information.

In step S1005, the edge image generation unit 810 generates edge image data in which a portion, of a peripheral portion of the image data displayed by the display apparatus 130, corresponding to the identified position is caused to have a first color (e.g., red) and the remaining portion is caused to have a second color (e.g., white).

On the other hand, in step S1003, in the case where an obstacle behind the vehicle approaching with a speed equal to or greater than the predetermined speed is not detected (in case of "No" in step S1003), the flow moves to step S1006. In step S1006, the edge image generation unit 810 generates edge image data in which the entire peripheral portion of the image data displayed by the display apparatus 130 is caused to have a second color (e.g., white).

SUMMARY

As clearly described in the above, a display control apparatus 120 according to an embodiment of the present invention:

receives, as vehicle information, data indicating a distance to an obstacle behind the vehicle and a direction of the obstacle, and detects an obstacle behind the vehicle approaching with a speed equal to or greater than a predetermined speed, and , in the case where an obstacle behind the vehicle approaching with a speed equal to or greater than the predetermined speed is detected, identifies a position of the obstacle on the image data based on the distance to the obstacle and the direction of the obstacle, and generates edge image data in which the color of a portion corresponding to the identified position is different from the color of the other portions.

As described above, by using a portion of the edge image data, according to an embodiment of the present invention, it is possible for the driver to recognize an obstacle behind the vehicle approaching with a speed equal to or greater than the predetermined speed via the display apparatus.

Third Embodiment

In the first embodiment and the second embodiment, a camera monitoring system 100 has been described in which the display apparatus 130 is placed at a rear-view mirror position inside the vehicle, and the display apparatus 130 functions as an electric mirror. However, the camera monitoring system is not limited to the above. For example, a projection mirror may be placed at a rear-view mirror position inside the vehicle, and the projection mirror may function as an electric mirror by projecting display image data onto the projection mirror via a projector.

Figure 11A:
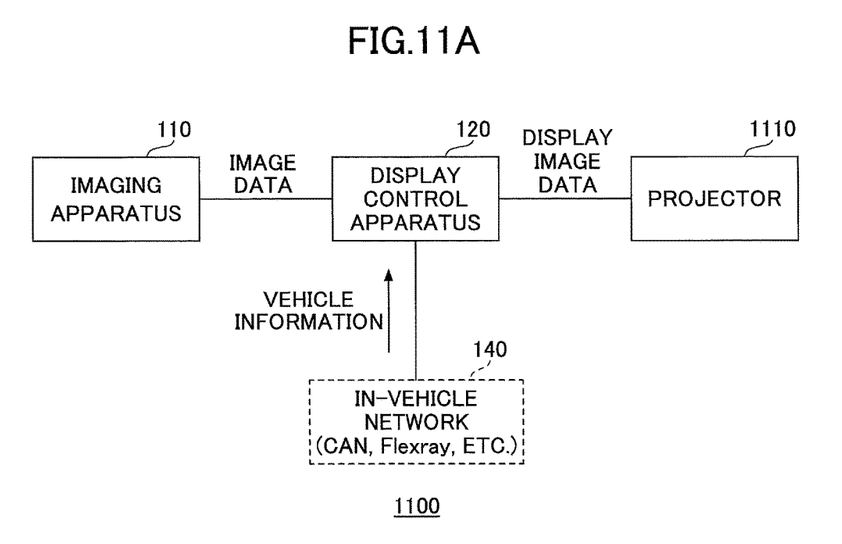
FIG. 11A and FIG. 11B are drawings illustrating an example of a system structure of a camera monitoring system according to a third embodiment.

FIGS. 11A and 11B are drawings illustrating an example of a system structure of a camera monitoring system 1100 according to a third embodiment. The camera monitoring system 1100 illustrated in FIG. 11A differs from the camera monitoring system 700 in FIG. 7 in that a projector (image projection apparatus) 1110 is provided, in place of the display apparatus 130, as an output apparatus. It should be noted that, in case of the camera monitoring system 1100, the display image data is projected onto the projection mirror and the display image data is optically flipped in a horizontal direction, and thus, it is not necessary for the imaging apparatus 110 to flip the captured image in a horizontal direction. Therefore, the display image data transmitted from the display control apparatus 120 to the projector 1110 is data in which the edge image data is superimposed onto the image data as obtained, without the captured image having been flipped in a horizontal direction.

Figure 11B:
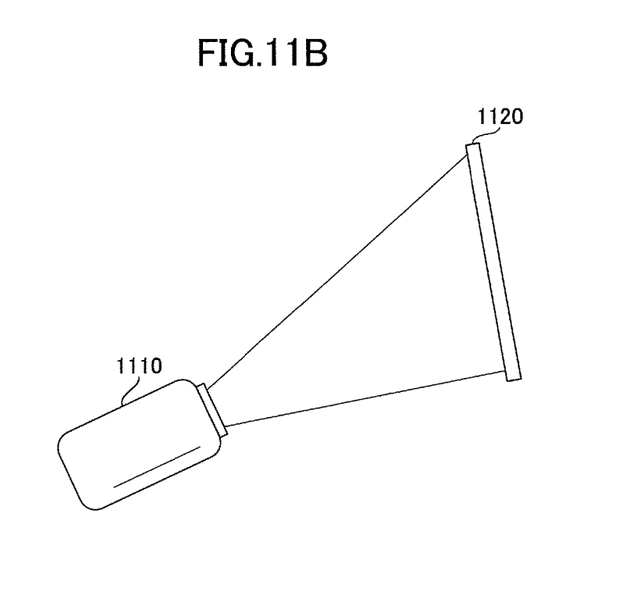

FIG. 11B is a drawing illustrating a relationship between the projector 1110 and a projection mirror 1120. In an embodiment of the present invention, it is assumed that the projector 1110 is placed inside the vehicle at the ceiling part. As illustrated in FIG. 11B, the display image data, transmitted from the projector 1110 placed at the ceiling part, is projected onto the projection mirror 1120 placed at a rear-view mirror position inside the vehicle. With the above operations, it is possible for a driver of the vehicle to recognize the display image data via the projection mirror 1120. It should be noted that the display image data transmitted from the projector 1110 is projected onto a partial area of the projection mirror 1120. Therefore, in this case, by clearly indicating the peripheral portion of the image, it becomes easier for the driver to recognize the boundary between an area in which an image is viewed via the projection mirror 1120 and an area in which the image is not viewed (that is, the boundary between the image and the surroundings of the image).

Other Embodiments

In the first to third embodiments, cases have been described in which the entire captured image, captured by the imaging apparatus 110, is used for generating the image data. However, the image data may be generated by using a part of the captured image. In this case, for example, an area used for the image data may be specified by the driver.

Further, in the first and the second embodiments, the image data, in which the captured image has been flipped horizontally by the imaging apparatus 110, has been transmitted to the display control apparatus 120. However, the process of flipping the captured image in a horizontal direction may be performed by the display control apparatus 120.

Further, in the first and the second embodiments, it is assumed that the display apparatus 130 is placed at a rear-view mirror position inside the vehicle. However, the structure of the camera monitoring system is not limited to the above. For example, a display apparatus, to whose front surface a movable semi-transparent mirror (half mirror) is attached, may be placed at a rear-view mirror position inside the vehicle. In this case, when a mode for displaying the display image data is turned ON, the display apparatus starts displaying the display image data, and, when the mode is turned OFF, the display apparatus stops displaying the display image data. During this period (while the mode is ON), the driver monitors behind the vehicle via the display image data displayed by the display apparatus.

With respect to the above, if the mode for displaying the display image data is turned OFF, then, a mode in which the semi-transparent mirror functions as a rear-view mirror is turned ON, and the semi-transparent mirror moves to a predetermined position. In this case, the driver monitors behind the vehicle via the semi-transparent mirror. However, even when the mode in which the semi-transparent mirror functions as a rear-view mirror is ON, the edge image data may be displayed in the case where an obstacle behind the vehicle, approaching with a speed equal to or greater than a predetermined speed, is detected. In other words, even when the mode for displaying the display image data is OFF, the edge image data may be displayed in the case where predetermined information is detected from the vehicle information.

Further, in the first embodiment, a case of automatic color selection of the edge image data has not been particularly described in detail. For example, the color selection (or, the display format selection) may be performed automatically according to the vehicle information. Specifically, information related to the brightness around the vehicle may be obtained as the vehicle information, and the display format of a part or all of the edge image data may be changed according to the obtained information related to the brightness around the vehicle. With the above operations, for example, it becomes possible to change the display format to make it easier for the driver to monitor the display according to whether it is, for example, daytime hours, nighttime hours, a cloudy day, or, a fine day. It should be noted that the information related to the brightness around the vehicle may be, for example, information generated based on a signal received from an illuminance sensor, or information generated based on an ON/OFF signal of headlights of the vehicle.

Further, in the second embodiment, the edge image data is generated in which the color of a portion, corresponding to a position of the obstacle on the image data approaching with a speed equal to or greater than the predetermined speed, is caused to be different from the color of the other portions. However, the display format of the portion, corresponding to the position of the obstacle on the image data approaching with a speed equal to or greater than the predetermined speed, is not limited to the above. For example, the portion, corresponding to the position of the obstacle on the image data, may be caused to blink, by generating the edge image data so as to display the same color as the other portions at a predetermined period.

Further, in the second embodiment, the display format of a part of the edge image data is changed by using data, of vehicle information received from the in-vehicle network 710, indicating the distance to the obstacle behind the vehicle and the direction of the obstacle. In other words, in the second embodiment, a part of the edge image data is used for reporting, to the driver, an existence of an obstacle approaching with a speed equal to or greater than the predetermined speed. However, the use of the edge image data is not limited to the above. The display format of a part or all of the edge image data may be changed in the case where another information that should be reported is detected from the vehicle information.

For example, in the case where information related to the gear of the vehicle is used as the vehicle information, the display format of the entire edge image data may be changed according to whether the gear is shifted to D (Drive) by the driver, or, the gear is shifted to R (Reverse). With the above operations, it is possible for the driver to recognize the state of the gear of the vehicle via the electric mirror.

Further, in the second embodiment, the approaching obstacle detection unit 800 detects an obstacle behind the vehicle approaching with a speed equal to or greater than the predetermined speed, by receiving data indicating the distance to the obstacle behind the vehicle and the direction of the obstacle from the in-vehicle network 710. However, the approaching obstacle detection unit 800 may detect an obstacle behind the vehicle approaching with a speed equal to or greater than the predetermined speed, by receiving the image data obtained by the image data obtaining unit 410. In this case, it is assumed that the approaching obstacle detection unit 800 detects an obstacle behind the vehicle approaching with a speed equal to or greater than the predetermined speed, by, for example, calculating the enlarging rate of the obstacle included in the image data between predetermined frames.

It should be noted that the present invention is not limited to the embodiments described above, and may be combined with other elements. Various modifications may be possible without departing from the spirit of the present invention.

The present application is based on and claims the benefit of priority of Japanese Priority Application No. 2017-079772 filed on Apr. 13, 2017, the entire contents of which are hereby incorporated herein by reference.

What is claimed is:

1. A display control apparatus configured to be connected to an imaging apparatus, the display control apparatus comprising:
    a memory; and
    a processor coupled to the memory, wherein
    the processor obtains image data captured by the imaging apparatus by capturing an image behind a vehicle,
    generates edge image data that indicates a peripheral portion of the image data to be viewed via an electric mirror that is placed at a rear-view mirror position inside the vehicle,
    generates display image data by superimposing the generated edge image data onto the obtained image data, and
    controls the generated display image data to be viewed via the electric mirror, wherein
    the edge image data indicates a boundary between a front view and the display image data,
    and wherein
    the processor detects an obstacle approaching from behind the vehicle with a speed equal to or greater than a predetermined speed, and
    controls only the generated edge image data that indicates the peripheral portion to be viewed via the electric mirror without having the display image data displayed in a case where controlling for the display image data is stopped, but the obstacle is detected by the processor.

2. The display control apparatus according to claim 1, wherein the processor generates the edge image data with a display format corresponding to vehicle information.

3. The display control apparatus according to claim 1, wherein the processor generates the edge image data by changing a part or all of a display format of the peripheral portion in a case where predetermined information requiring a report has been detected from vehicle information.

4. The display control apparatus according to claim 1, wherein
    the processor identifies a position, of the obstacle detected by the processor, on the image data, and generates the edge image data in such a way that a display format of a portion, of the peripheral portion, corresponding to the identified position is different from the display format of the other portions.

5. A display control method of a display control apparatus, the display control method comprising:
    obtaining image data obtained by capturing a view behind a vehicle;
    generating edge image data that clearly indicates a peripheral portion of the image data to be viewed via an electric mirror that is placed at a rear-view mirror position inside the vehicle;
    generating display image data by superimposing the generated edge image data onto the obtained image data; and
    controlling the generated display image data to be viewed via the electric mirror, wherein
    the edge image data indicates a boundary between a front view and the display image data,
and wherein the display control method further comprising
    detecting an obstacle approaching from behind the vehicle with a speed equal to or greater than a predetermined speed, and
    controlling only the generated edge image data that indicates the peripheral portion to be viewed via the electric mirror without having the display image data displayed in a case where controlling for the display image data is stopped, but the obstacle is detected by the processor.

6. A camera monitoring system comprising:
    an imaging apparatus configured to capture an image behind a vehicle;
    a display control apparatus configured to process image data captured by the imaging apparatus; and
    an output apparatus connected to the display control apparatus, wherein the display control apparatus includes
    a memory and a processor coupled to the memory, wherein
    the processor obtains image data captured by the imaging apparatus by capturing an image behind a vehicle,
    generates edge image data that clearly indicates a peripheral portion of the image data to be viewed via an electric mirror that is placed at a rear-view mirror position inside the vehicle,
    generates display image data by superimposing the generated edge image data onto the obtained image data, and
    controls the output apparatus in such a way that the generated display image data is viewed via the electric mirror, wherein
    the edge image data indicates a boundary between a front view and the display image data, and wherein
    the processor detects an obstacle approaching from behind the vehicle with a speed equal to or greater than a predetermined speed, and
    controls only the generated edge image data that indicates the peripheral portion to be viewed via the electric mirror without having the display image data displayed in a case where controlling for the display image data is stopped, but the obstacle is detected by the processor.

* * * * *